May 27, 1930.  G. H. HEBEBRAND  1,760,407
PERCENTAGE FEEDER
Filed Feb. 4, 1928   2 Sheets-Sheet 1

INVENTOR:
GEORGE H. HEBEBRAND.
By Elliott Harrington
ATTORNEYS.

May 27, 1930.　　　G. H. HEBEBRAND　　　1,760,407
PERCENTAGE FEEDER
Filed Feb. 4, 1928　　2 Sheets-Sheet 2
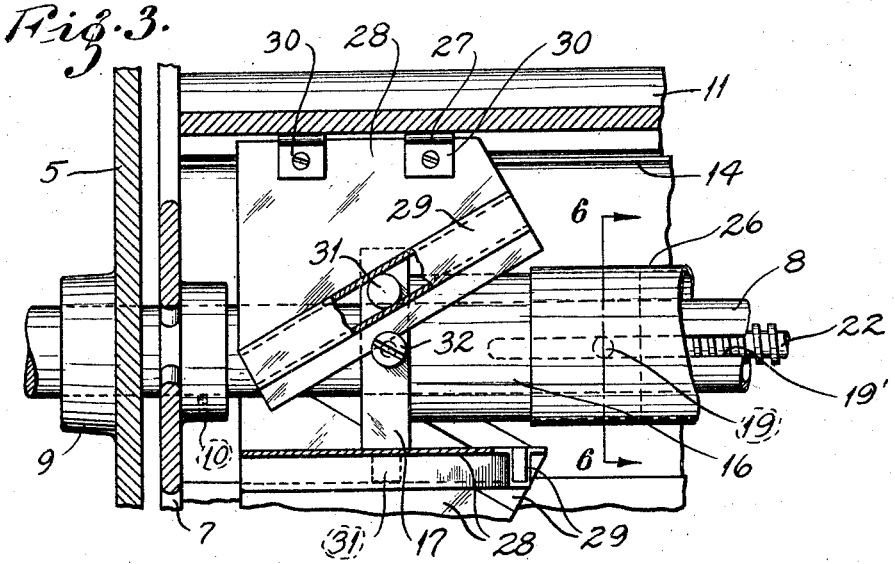
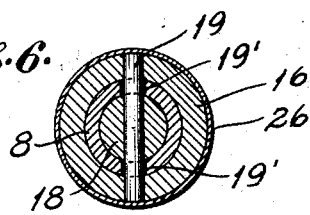
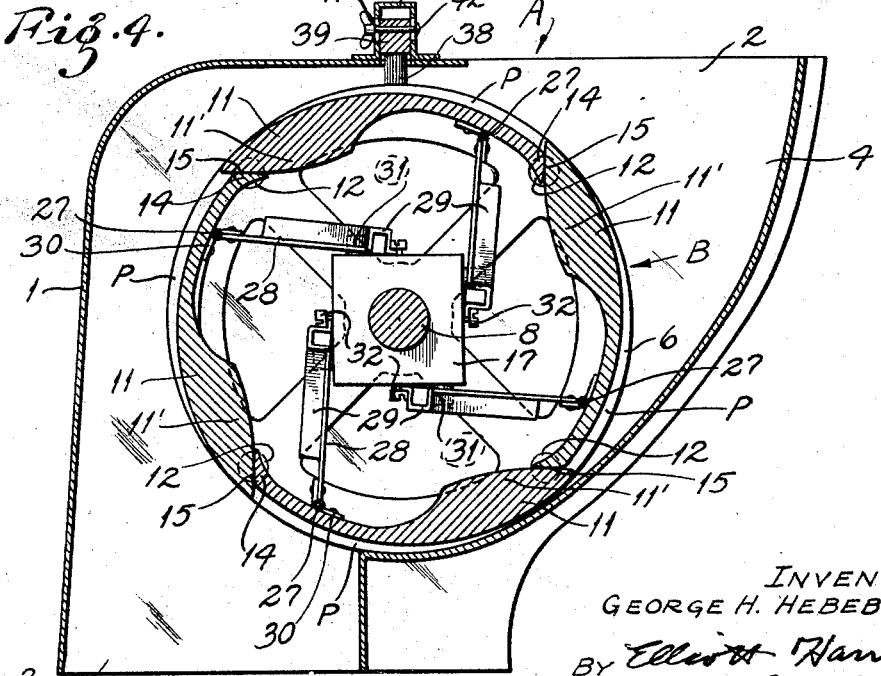
INVENTOR:
GEORGE H. HEBEBRAND.
By Elliott Harrington
ATTORNEYS.

Patented May 27, 1930

1,760,407

UNITED STATES PATENT OFFICE

GEORGE H. HEBEBRAND, OF FLORISSANT, MISSOURI

PERCENTAGE FEEDER

Application filed February 4, 1928. Serial No. 251,794.

This invention relates to power-driven feeding machines of the type generally known as percentage feeders, which are designed to uniformly deliver regulated quantities of the produce being fed, the predominant object of the invention being to produce a machine of the type mentioned which is provided with a feed wheel or other feeding member having pockets capable of close and accurate adjustment to vary the dimensions thereof, whereby the quantitative feed of the machine may be varied.

Prior to this invention, percentage feeders have been produced, the feeding members of which were provided with approximately radially arranged stationary partitions with respect to which certain adjustable elements were moved to vary the dimensions of the pockets defined by said partitions, said adjustable elements and the side members of the feeding members. While percentage feeders constructed as described have been found to function quite efficiently, it was discovered that the radially arranged partitions caused some trouble in that because of their thinness, they frequently warped or otherwise became misshapen so that it was difficult to maintain smooth and close contact between the adjustable elements and the radial partitions.

In view of the foregoing and in order to greatly reduce the complexity of the apparatus, I have devised the percentage feeder disclosed herein, which is so constructed and arranged that the stationary radial partitions referred to are completely eliminated. In accordance with my new structure, the various adjustable elements forming parts of the pockets are arranged to move in close contact with respect to each other so that pockets of varying dimensions may be produced, thus providing for accurately varying the quantitative feed of the apparatus which operates uniformly under any given adjustment.

Machines of this character find a very wide application in flour mills for use in blending grains, flour, and the like, and it is very desirable that the machine should be capable of nice adjustment and should operate with a high degree of uniformity. To obtain uniformity of operation of my machine at all times, I provide same with a scale whereby the operator may set the machine accurately to provide a given quantitative feed of material, and by observing the scale, may know at all times the amount of material being fed through the machine.

Figure 3 is a fragmentary detail on an enlarged scale showing the means for adjusting the movable elements forming parts of the pockets of the feeding member;

Figure 4 is a view similar to Fig. 2, but showing the movable elements forming parts of the pockets in moved positions to provide smaller pockets;

Figure 5 is a fragmentary sectional detail showing the manner of pivoting the movable elements forming parts of the pockets;

Figure 6 is a cross-section on line 6—6 of Fig. 3.

Figure 1:
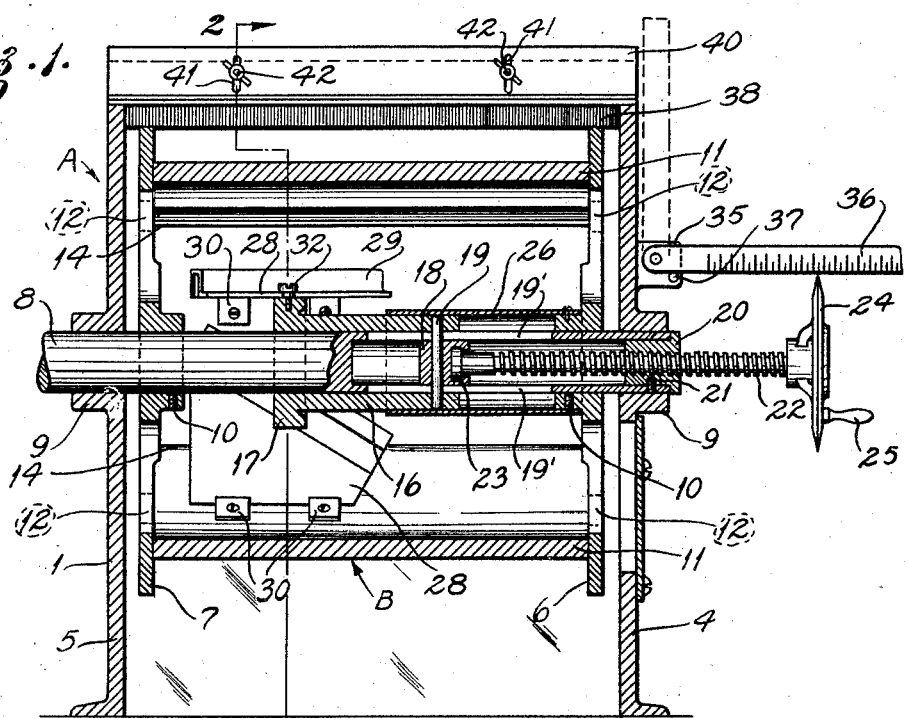
Figure 1 is a vertical section through the improved percentage feeder.

In the drawings, which illustrate one embodiment merely of the invention, A designates my improved percentage feeder which comprises a casing 1 having an inlet opening 2 at its top through which material flows to the rotary feeding member B of the apparatus. The casing 1 is also provided with an outlet opening 3 at its bottom through which the material is discharged, and said casing is provided with side walls 4 and 5 as shown in Fig. 1.

Mounted for rotation within the casing 1 is the rotary feeding member B above referred to, said member including a pair of oppositely disposed side members 6 and 7 provided each with a hub portion. The side members 6 and 7 are fixed to a shaft 8 which is rotatably supported in suitable bearings 9 formed on the side walls 4 and 5 of the the casing 1 by means of suitable fastening devices, such as the set screws 10 shown in Fig. 1.

Arranged between the side members 6 and 7 of the feeding member B is a plurality of segmental members 11, each of which is pivoted at one end to the oppositely disposed side members 6 and 7. To this end, each of said segmental members is provided with laterally extended circular trunnions 12 which are preferably formed integral with it and project outwardly from its opposite side edges to extend into circular apertures formed in the side members 6 and 7. Each of the segmental members is of increased thickness adjacent to the end thereof at which it is pivoted to the side members 6 and 7, as indicated by the reference character 11', and the thickened portion 11' of each segmental member is provided with an arcuate face 13, as shown clearly in Figs. 2 and 4. Likewise, each segmental member at the end opposite to the pivoted end thereof is provided with an offset portion 14, provided with an arcuate face 15, which is adapted to engage and slide over the arcuate face 13 of the adjacent segmental member.

The outer faces of the segmental members 11, the arcuate faces 13 of said segmental members, and the inner faces of the side members 6 and 7 define pockets P (Figs. 2 and 4) which receive the product being fed and carry said product from the inlet side of the casing 1 to the discharge side thereof, and the curvatures of the arcuate faces 13 and 15 are such that on equal and simultaneous movement of the various segmental members 11 about their several pivots, the dimensions of the pockets P will be varied, the various co-operating faces 13 and 15 during such movement of said segmental members and before and after same, being maintained in very close contact with each other to prevent escape between said co-operating faces of the product contained within the pockets.

Mounted for sliding movement on the shaft 8 is a cylindrical member 16 provided at one of its ends with a rectangular head 17. The shaft 8, as shown clearly in Fig. 1, is hollow in one end portion, and arranged within said hollow portion is a traveler 18. 19 designates a pin which passes through an aperture formed in the traveler 18 and through oppositely disposed elongated openings 19' formed in the shaft 8, the opposite end portions of said pin being extended into apertures formed in the cylindrical member 16, whereby said cylindrical member is connected to and travels with the traveler 18. Located at the outer end of the hollow portion of the shaft 8 is an internally threaded plug 20, said plug being rigidly fixed to said shaft by means of a set screw 21. 22 designites a threaded rod which extends through the internally threaded plug 20 and is provided at one end with a head 23 rotatably arranged within a recess formed in the traveler 18. At its opposite end, the threaded rod 22 is provided with an annular indicator 24 which is rigidly fixed to said rod and is provided with a handle 25 whereby the annular indicator and the rod 22 associated therewith may be conveniently rotated. When the threaded rod 22 is rotated, longitudinal movement will be imparted thereto the cylindrical member 16 will be moved with relation to the shaft 8. To prevent the product being fed from passing through the elongated openings 19' into the interior of the hollow portion of the shaft 8, I employ a tubular shield 26 which is fixed at one of its ends to the hub portion of the side member 6 (Fig. 1), and at its other end slidably receives the cylindrical member 16. The shield 26 is of such length that the end portion of said cylindrical member to which the traveler 18 is attached is always within the tubular member 26 regardless of the extent of movement of said cylindrical member longitudinally of said tubular member in a direction toward the left in Fig. 1.

Figure 2:
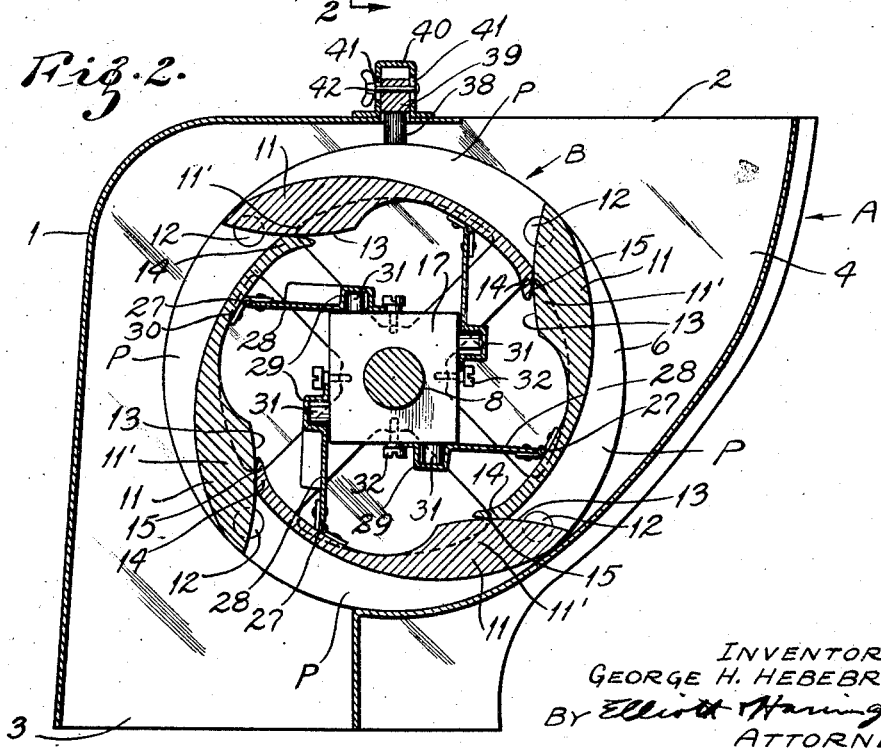
Figure 2 is a cross-section on line 2—2 of Fig. 1.

Hingedly attached to each individual segmental member 11 at a point indicated by the reference character 27 is a plate 28, said plate being bent so that same is provided with a channel 29, and said channel being arranged at an angle with respect to the axes of the hinges 30 employed to attach the plate 28 to the associated segmental member 11. As shown clearly in Figs. 2 and 4, the end portions of the plates 28 remote from the hinged ends thereof are in contact, respectively, with the straight faces of the rectangular head 17 associated with the cylindrical member 16, and said rectangular head is provided with a plurality of circular extensions 31 which extend into the channels 29 formed on the respective plates 28. Also, each straight face of the rectangular head 17 is provided with a screw 32 having an enlarged head which overlaps the associated plate 28, as shown in Figs. 2 and 4, so that the outer ends of said plates may not swing away from the rectangular head 17 when the feeding member B of which said plates 28 form parts, is rotated.

If, in the use of my improved percentage feeder, it is desired to vary the dimensions of the pockets P to vary the volumetric capacity of said pockets, the handle 25 on the annular indicator 24 will be grasped and the threaded rod 22 rotated by rotating said indicator. The result of this will be that said rod 22 and the traveler 18 will be moved longitudinally of the shaft 8 in one direction or the other, resulting in a corresponding movement of the cylindrical member 16. As the cylindrical member 16 is moved longitudinally of the shaft 8 as described, the extensions 31 on the rectangular head portion thereof will engage with the side walls of the channels formed in the respective plates 28, and as these side walls are extended at an angle with respect to the direction of travel of the extensions 31, the plates 28 will be moved outwardly or inwardly with respect to the feeding member B, depending on the direction of movement of the extensions. The plates 28 are, as already stated, hingedly attached to the segmental members 11; hence, movement of the plates as described will impart corresponding movement to the segmental members 11, which segmental members will swing about their pivots 12. It has already been explained that the curvatures of the arcuate faces 13 and 15 are such that when the segmental members are swung on their respective pivots, the co-acting faces 13 and 15 will remain in close contact with each other. Hence, movement of the segmental members may be produced in the manner described to vary the dimensions of the pockets P while the percentage feeder is in operation without loss from the pockets of the product being fed. It is plain, therefore, that on axial rotation of the rod 22, the segmental members 11 are equally and simultaneously adjusted to vary the dimensions of all of the pockets P, and as already stated, this adjustment may take place while the device is in operation.

35 designates a support arranged on the side wall 4 of the casing to which is pivotally secured a scale 36 having graduations arranged thereon, said support 35 being provided with a stop 37 arranged to maintain the scale 36 in a horizontal position, in which position it will be located immediately above the annular indicator 24 and in alinement with its direction of movement when the rod 22 is moved longitudinally. Due to the pivotal arrangement of the scale 36, said scale may be moved to the position in which same is shown in dotted lines in Fig. 1, in which position it will not interfere with free rotation of the annular indicator 24 and the parts associated therewith. In view of the use of the scale 36, it is plain that the device may be set to feed a predetermined amount of material, and also it is obvious that the operator may determine, by referring to the position of the annular indicator with respect to the scale, the amount of material being fed by the device.

To maintain the level of the product in the pockets P flush with the upper edges of said pockets so that an excessive amount of material may not be carried by said pockets, I employ a wiping device which comprises a brush arranged longitudinally of the feeding member B above and in approximate alinement with the shaft 8. The brush referred to preferably comprises bristles 38 formed of any suitable material, and a supporting portion 39 for said bristles. The portion 39 of the brush is mounted in an inverted channel-shaped member 40 which is fixed to the casing 1 at the top thereof, as shown in Figs. 2 and 4, the opposite side walls of said channel-shaped member 40 being provided with elongated vertically arranged openings 41. 42 designates a bolt which extends through the elongated openings 41 in the side walls of the channel-shaped member 40 and through an aperture formed in the portion 39 of the brush, said bolt being provided at an end thereof with a wing-nut or similar device capable of convenient adjustment whereby the brush may be moved vertically with respect to the channel-shaped member 40 and may be clamped at various elevations with respect thereto.

In the operation of the percentage feeder, the lower ends of the bristles of the brush will wipe away the excessive amounts of material which may enter the pockets P and thus maintain the proper level of material within said pockets. Also, as the bristles of the brush are worn off in use, said brush may be adjusted to keep the lower ends of the bristles in proper position with respect to the pockets P.

I claim:

1. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of movable elements adjustable to vary the volumetric capacity of the pocket.

2. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of movable elements adjustable to vary the volumetric capacity of the pocket, and each of said movable elements forming parts of a plurality of pockets.

3. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of elements movable with respect to and in contact with each other to vary the volumetric capacity of the pocket.

4. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of elements movable with respect to and in contact with each other to vary the volumetric capacity of the pocket, and each of said movable elements forming parts of a plurality of pockets.

5. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of elements movable with respect to and in contact with each other to vary the volumetric capacity of the pocket, and said elements having contacting faces shaped to permit of the co-acting elements being maintained in close contact with each other while same are being adjusted.

6. A feeding machine of the class described comprising a casing affording an inlet and an outlet for material, a feeding member rotatably mounted in the casing between said inlet and outlet, and a plurality of pockets formed in the periphery of said feeding member, each of said pockets being formed by a plurality of elements movable with respect to and in contact with each other to vary the volumetric capacity of the pocket, and said elements having arcuate contacting faces adapted to permit of the co-acting elements being maintained in close contact with each other while same are being adjusted.

7. A feeding machine of the class described comprising a casing affording an inlet and an outlet for material, a feeding member rotatably mounted in the casing between said inlet and outlet, a plurality of pockets formed in the periphery of said feeding member, each of said pockets being formed by a plurality of elements movable with respect to and in contact with each other to vary the volumetric capacity of the pocket, and means whereby the movable elements forming the pockets may be simultaneously actuated to simultaneously adjust all of the pockets.

8. A feeding machine of the class described comprising a casing affording an inlet and an outlet for material, a feeding member rotatably mounted in the casing between said inlet and outlet, a plurality of pockets formed in the periphery of said feeding member, each of said pockets being formed by a plurality of elements movable with respect to and in contact with each other to vary the volumetric capacity of the pocket, and means whereby the movable elements forming the pockets may be simultaneously moved to simultaneously adjust all of the pockets, said means comprising travelling elements and members hingedly attached to said movable elements and having faces arranged at an angle with respect to the direction of travel of said travelling elements, said travelling elements being arranged to move in contact with said inclined faces to impart movement to said hingedly attached members.

9. A feeding machine of the class described comprising a casing affording an inlet and an outlet for material, a feeding member rotatably mounted in the casing between said inlet and outlet, a plurality of pockets formed in the periphery of said feeding member, each of said pockets being formed by a plurality of elements movable with respect to and in contact with each other to vary the volumetric capacity of the pocket, and means whereby the movable elements forming the pockets may be simultaneously actuated to simultaneously adjust all of the pockets, said means comprising a travelling head, extensions on said head, and means hingedly attached to said movable elements and having each a channel formed therein into which one of said extensions is projected, the walls of said channels being arranged at an angle to the direction of travel of said travelling head, and the extensions within said channels being adapted to contact with said angularly arranged walls to impart movement to said hingedly attached members.

10. A feeding machine of the class described comprising a casing affording an inlet and an outlet for material, a feeding member rotatably mounted in the casing between said inlet and outlet, a plurality of pockets formed in the periphery of said feeding member, each of said pockets being formed by a plurality of elements movable with respect to and in contact with each other to vary the volumetric capacity of the pocket, and means whereby the movable elements forming the pockets may be simultaneously actuated to simultaneously adjust all of the pockets, said means comprising a travelling head, extensions on said head, members hingedly attached to said movable elements and having each a channel formed thereon into which one of said extensions is projected, the walls of said channels being arranged at an angle with respect to the direction of travel of said travelling head, and said extensions being adapted to contact with said walls of said channels to impart movement to said hingedly attached members, and screwthreaded means arranged for axial rotation and longitudinal movement whereby movement is imparted to said travelling head.

In testimony whereof, I have hereunto set my hand.

GEORGE H. HEBEBRAND.